(12) United States Patent
Smith

(10) Patent No.: US 8,786,687 B1
(45) Date of Patent: Jul. 22, 2014

(54) AUTO-STEREOSCOPIC DISPLAY WITH LENTICULES AND ELONGATED LIGHT FILTERS

(75) Inventor: David Alan Smith, Cary, NC (US)

(73) Assignee: Lockheed Martin Corporation, Bethesda, MD (US)

( * ) Notice: Subject to any disclaimer, the term of this patent is extended or adjusted under 35 U.S.C. 154(b) by 392 days.

(21) Appl. No.: 12/951,651

(22) Filed: Nov. 22, 2010

(51) Int. Cl.
*H04N 13/04* (2006.01)

(52) U.S. Cl.
USPC ............................................................ 348/59

(58) Field of Classification Search
CPC   H04N 13/04; H04N 13/0404; H04N 13/0402
USPC ............................................................ 348/59
IPC ........................................................ H04N 13/04
See application file for complete search history.

(56) References Cited

U.S. PATENT DOCUMENTS

| | | | | |
|---|---|---|---|---|
| 5,162,897 | A * | 11/1992 | Jitsukata et al. ................ | 348/59 |
| 5,793,341 | A * | 8/1998 | Omori et al. ..................... | 348/42 |
| 6,128,059 | A * | 10/2000 | Nishiguchi ..................... | 349/129 |
| 7,099,080 | B2 | 8/2006 | Lipton et al. | |
| 7,609,445 | B2 * | 10/2009 | Hamagishi ..................... | 348/59 |
| 7,864,422 | B2 * | 1/2011 | Jung ............................... | 348/59 |
| 8,218,096 | B2 * | 7/2012 | Cha et al. ........................ | 348/59 |
| 8,248,457 | B2 * | 8/2012 | Goldstein et al. .............. | 348/59 |
| 8,456,516 | B2 * | 6/2013 | Kimpe ............................ | 348/42 |
| 2007/0146845 | A1 * | 6/2007 | Hirabara et al. ................ | 359/23 |
| 2007/0279319 | A1 * | 12/2007 | Yamazaki et al. ............. | 345/32 |
| 2008/0303832 | A1 * | 12/2008 | Kim et al. ....................... | 345/501 |
| 2008/0304014 | A1 | 12/2008 | De Vaan | |
| 2009/0257000 | A1 * | 10/2009 | Ogasawara et al. ............ | 349/64 |
| 2009/0303313 | A1 | 12/2009 | Yukich | |
| 2010/0002295 | A1 * | 1/2010 | Kimpe ........................... | 359/465 |
| 2010/0097698 | A1 | 4/2010 | Kinoshita et al. | |
| 2010/0157030 | A1 | 6/2010 | Nayar et al. | |
| 2011/0063575 | A1 * | 3/2011 | Nelson et al. ................. | 359/463 |
| 2011/0249093 | A1 * | 10/2011 | Yeh et al. ....................... | 348/46 |

OTHER PUBLICATIONS

Dodgson et al., Autostereoscopic 3D Displays, IEEE Computer Society, Computer vol. 38, Issue: 8, Aug. 2005, pp. 31-36.*
Naone, Erica, "Will 3-D Make the Jump from Theater to Living Room?", MIT Technology Review, Jan. 19, 2010, accessed Jun. 29, 2010, http://www.technologyreview.com/computing/24373/page1/, 3 pages.
Unknown, "Autostereoscopy," Wikipedia—the free encyclopedia, accessed Jul. 23, 2010, http://en.wikipedia.org/wiki/Autostereoscopy, 3 pages.

(Continued)

*Primary Examiner* — Jay Patel
*Assistant Examiner* — Francis G Geroleo
(74) *Attorney, Agent, or Firm* — Withrow & Terranova, PLLC

(57) ABSTRACT

An auto-stereoscopic display which includes a screen substrate having a first face and a second face. A lenticular array having a plurality of lenticules extending in a first direction and a second direction is affixed to the first face. A plurality of first elongated light filters is affixed to the second face. The first elongated light filters extend parallel to the plurality of lenticules and are adapted to pass light waves having a first orientation. A plurality of second elongated light filters extending parallel to the plurality of lenticules is affixed to the second face and adapted to pass light waves having a second orientation.

18 Claims, 5 Drawing Sheets

(56) References Cited

OTHER PUBLICATIONS

Unknown, "The Lenticular Screen," University of Houston Digital Media Program, accessed Jul. 23, 2010, http://graphics.tech.uh.edu/student_work/specialty_printing/Specialty_Printing/The_Lenticular_Screen.html, 3 pages.

Unknown, "Making Lenticular Products," University of Houston Digital Media Program, accessed Jul. 23, 2010, http://graphics.tech.uh.edu/student_work/specialty_printing/Specialty_Printing/Making_Lenticular_Products.html, 1 page.

Canny, John, "Lenticular Arrays (slide)," Lecture 27—Design Realization, Design Realization 2, University of California at Berkeley Department of Computer Science, Dec. 2, 2003, accessed Jul. 23, 2010, http://www.cs.berkeley.edu/~jfc/DR/F03/lectures/lec27/lec27.ppt, 1 page.

Unknown, "Polarization (waves) (excerpt)", Wikipedia—the free encyclopedia, accessed Jul. 23, 2010, http://en.wikipedia.org/wiki/Polarization_%28waves%29, 1 page.

Unknown, "Polarizer," Camerapedia, accessed Jul. 23, 2010, http://www.camerapedia.org/wiki?title=Polarizer&printable=yes, 3 pages.

Pastoor, S., et al., "3-D Displays: A review of current technologies," University of Toronto Dynamic Graphics Project, 1997, accessed Jun. 29, 2010, http://www.dgp.toronto.edu/~gf/Research/Volumetric%20UI/3-D%20Displays%20A%20review%20of%20current%20technologies.htm, 21 pages.

Unknown, "Lenticular lens," Wikipedia—the free encyclopedia, accessed Jul. 23, 2010, http://en.wikipedia.org/wiki/Lenticular_lens, 5 pages.

Unknown, "Stereoscopy," Wikipedia—the free encyclopedia, accessed Jul. 23, 2010, http://en.wikipedia.org/wiki/Stereoscopy, 17 pages.

Unknown, "Circular polarization," Wikipedia—the free encyclopedia, accessed Jul. 23, 2010, http://en.wikipedia.org/wiki/Circular_polarization, 11 pages.

Unknown, "3-D film," Wikipedia—the free encyclopedia, accessed Jul. 23, 2010, http://en.wikipedia.org/wiki/3-D_film, 17 pages.

Silva, Robert, "Rear-Projection Television—What You Need to Know—Lens, Mirror, Screen, Box," About.com, accessed Jul. 23, 2010, http://hometheater.about.com/cs/television/a/aarearprotv_4.htm?p=1, 2 pages.

Unknown, "Chapter 7—John's 3D Guide," Crystal Canyons Photography, last updated Nov. 2004, accessed Jun. 29, 2010, http://crystalcanyons.net/Pages/3DGuidebook/ViewingMethods_Projection.htm, 6 pages.

\* cited by examiner

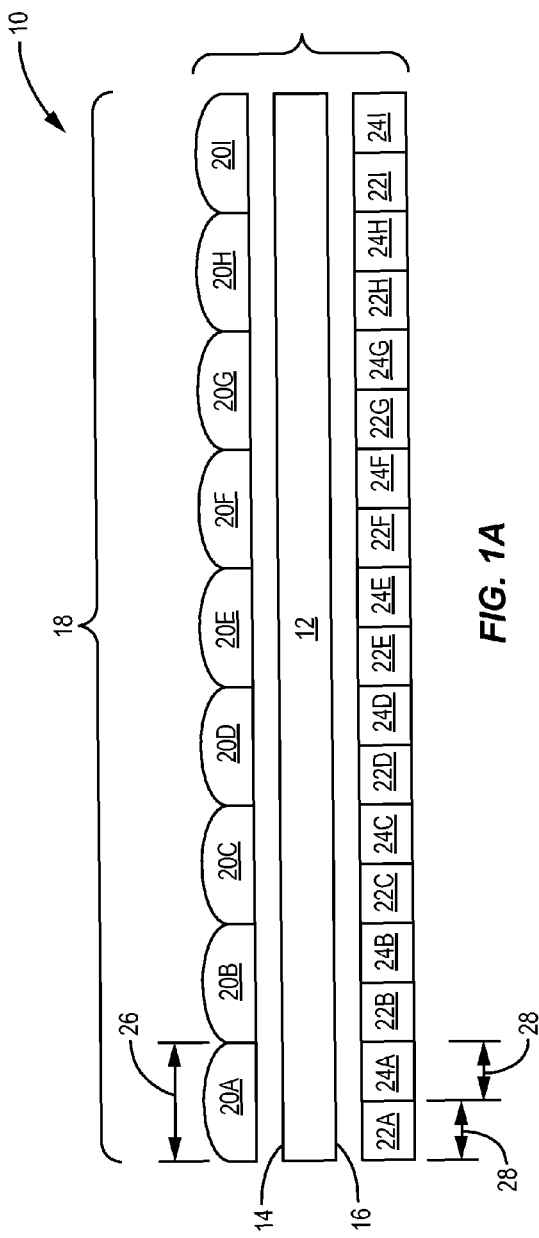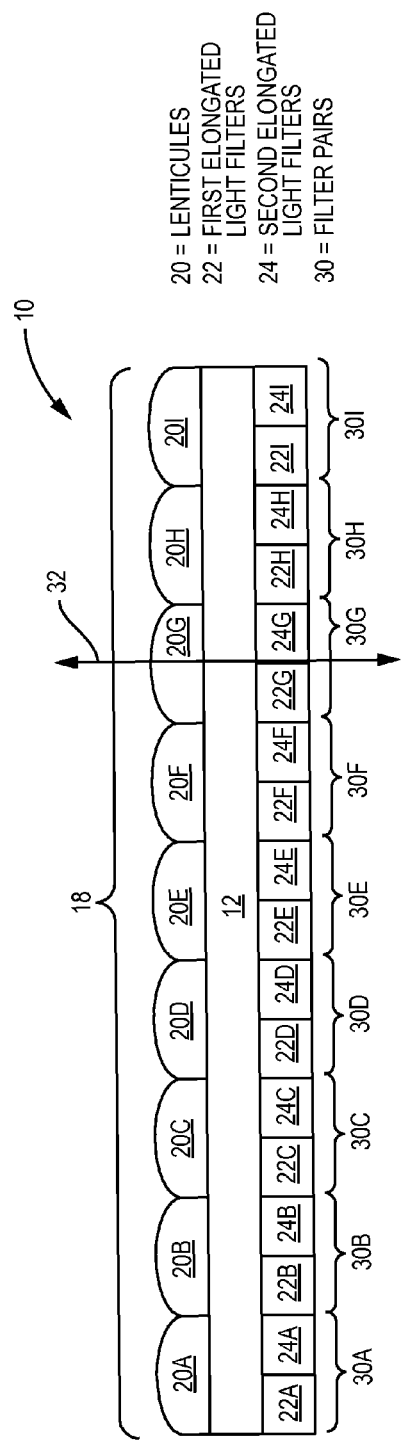
FIG. 1A
FIG. 1B
20 = LENTICULES
22 = FIRST ELONGATED LIGHT FILTERS
24 = SECOND ELONGATED LIGHT FILTERS
30 = FILTER PAIRS 20 = LENTICULES
22 = FIRST ELONGATED LIGHT FILTERS
24 = SECOND ELONGATED LIGHT FILTERS

AUTO-STEREOSCOPIC DISPLAY WITH LENTICULES AND ELONGATED LIGHT FILTERS

FIELD OF THE DISCLOSURE

Embodiments disclosed herein relate to stereoscopic images, and in particular to an auto-stereoscopic display.

BACKGROUND

Three-dimensional (3D) stereoscopic images are typically created by presenting each eye of a viewer with substantially identical images taken from slightly different perspectives. The viewer's brain fuses the two images together to create a 3D scene.

Passive or active glasses may be used to channel separate images to a viewer's eyes, however, active glasses can be expensive, and any pair of glasses can be cumbersome and uncomfortable, especially for those viewers who already wear prescription glasses.

Auto-stereoscopy techniques present separate images to each eye of a viewer without the use of glasses. Such techniques may require registration between an image-separating material, such as a lenticular array (sometimes referred to as a lenticular screen), which separates the images, and the pixels that display the images. Registration involves precise alignment between the image-separating material and the pixels, which may involve costly equipment and/or precision assembly techniques, and improper registration may diminish the effect or completely inhibit the ability of the display to provide an auto-stereoscopic image.

Accordingly, there is a need for a display that provides an auto-stereoscopic image that does not require precise registration between an image-separating material and pixels that display separate images.

SUMMARY

Embodiments disclosed herein relate to a display having a lenticular array affixed to a first face of a screen substrate and elongated light filters affixed to a second face of the screen substrate. The lenticular array includes a plurality of lenticules, each of which extends in first and second directions. The elongated light filters include first elongated light filters that pass light waves having a first orientation, and second elongated light filters that pass light waves having a second orientation. The first and second elongated light filters also extend in the first and second directions.

In one embodiment, each of the first elongated light filters is adjacent to at least one of the second elongated light filters. A first and second elongated light filter may comprise a filter pair. Each filter pair corresponds to one of the lenticules, and the filter pairs are affixed to the second face such that a line perpendicular to the first face of the screen substrate that extends through the center of a filter pair also extends through the corresponding lenticule.

The first elongated light filters pass light waves that have the first orientation and the second elongated light filters pass light waves that have the second orientation. For example, the first orientation may comprise light waves that are right-hand circularly polarized, and the second orientation may comprise light waves that are left-hand circularly polarized.

In one embodiment, the display is part of a system that includes a first light emitter, such as a first projector, that is adapted to emit light waves having the first orientation, and a second light emitter, such as a second projector, that is adapted to emit light waves having the second orientation. The first light emitter may emit first light waves that depict a first image of a pair of stereoscopic images, and the second light emitter may emit second light waves that depict a second image of the pair of stereoscopic images. The first elongated light filters pass the first light waves to the screen substrate, and the corresponding lenticule refracts the first light waves in the direction of a viewer's eye. The second elongated light filters pass the second light waves to the screen substrate, and the corresponding lenticule refracts the second light waves in the direction of the viewer's other eye.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 1A and 1B are block diagrams of a top view of a display according to one embodiment;

DETAILED DESCRIPTION

Figure 2A:
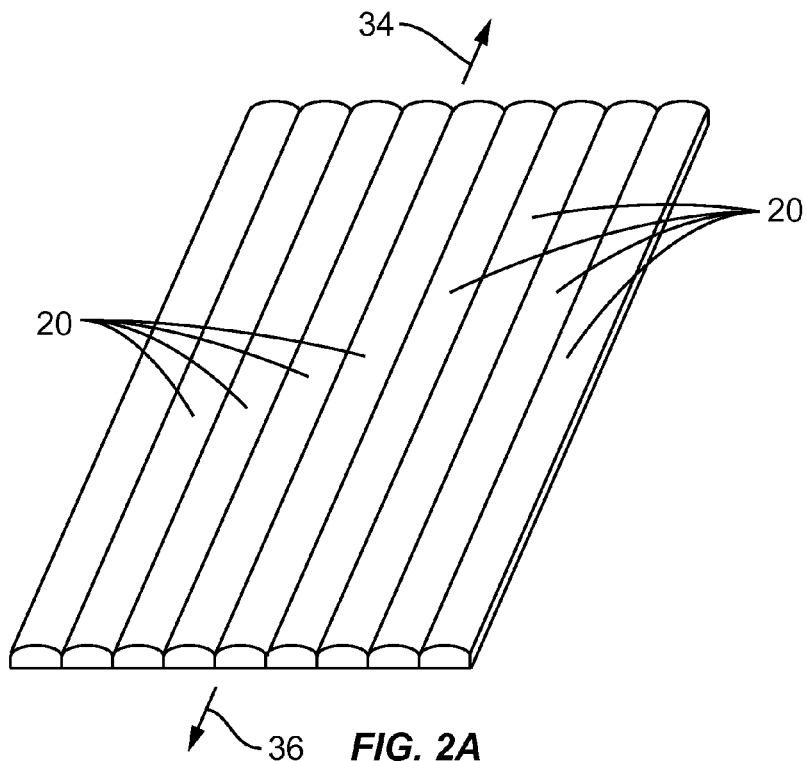
FIGS. 2A and 2B are block diagrams of front and rear surfaces of the display according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments disclosed herein relate to an auto-stereoscopic display that eliminates the need to register an image-separating material, such as a lenticular array, with image-producing pixels. For purposes of illustration, embodiments will be discussed in the context of a system having multiple projectors, each of which emits, or projects, light waves on a rear face of the display. However, embodiments are not limited to such systems, and have applicability in any application wherein pairs of stereoscopic images may be provided to the display, including, for example, applications such as rear-projection televisions.

FIG. 1A is a block diagram of an exploded top view illustrating various components of an exemplary display 10 according to one embodiment. The display 10 includes a screen substrate 12 having a first face 14 and a second face 16. The first face 14 may be referred to herein as the "front face," and faces a viewer. The second face 16 may be referred to herein as the "rear face," and faces light emitters, such as projectors. The screen substrate 12 may comprise any suitable screen material that passes light waves received from the second face 16 to the first face 14 for display to the viewer. The screen substrate 12 may be rigid or relatively flexible, however, in operation it is preferable that the screen substrate 12 is relatively planar.

A lenticular array 18 is affixed to, or otherwise formed on, the first face 14 and includes a plurality of lenticules 20A-20I (generally, lenticules 20 or lenticule 20). While only a relatively small number of lenticules 20 are illustrated, the lenticular array 18 may include hundreds, or thousands, of lenticules 20, depending on factors such as the width of the screen substrate 12 and the width of the lenticules 20. Each lenticule 20 refracts light entering the respective lenticule 20 from the first face 14 in a direction according to the particular geometry of the lenticule 20. The lenticular array 18 may be affixed to the first face 14 using any desired adhesive that bonds the lenticular array 18 to the first face 14 in a manner that does not substantially obscure the light waves passing through the lenticular array 18.

A plurality of first elongated light filters 22A-22I (generally, first elongated light filter 22 or first elongated light filters 22) is affixed to, or otherwise formed on, the second face 16. Each of the first elongated light filters 22 passes substantially all light waves having a first orientation, and filters out substantially all light waves having an orientation other than the first orientation. For example, the first orientation may be a particular polarized orientation, such as a linearly polarized orientation, or a particular right- or left-hand circularly polarized orientation. A plurality of second elongated light filters 24A-24I (generally, second elongated light filter 24 or second elongated light filters 24) is also affixed to the second face 16. Each of the second elongated light filters 24 passes substantially all light waves having a second orientation, and filters out substantially all light waves having an orientation other than the second orientation. The second orientation is different from the first orientation. For example, if the first orientation is a horizontally polarized orientation, the second orientation may be a vertically polarized orientation. Alternately, if the first orientation is a right-hand circularly polarized orientation, the second orientation may be a left-hand circularly polarized orientation. The plurality of first elongated light filters 22 and the plurality of second elongated light filters 24 may be affixed to the second face 16 via any desired adhesive or bonding agent that does not substantially obscure light waves passed by the respective filters. The first and second elongated light filters 22, 24 may comprise, for example, polarized filters.

The lenticules 20 have a first width 26. The first width 26 is preferably uniform across all lenticules 20, however, in one embodiment, the first width 26 may vary depending on the position of the respective lenticule 20 on the screen substrate 12. The first elongated light filters 22 and second elongated light filters 24 have a second width 28, which is generally about one-half of the first width 26 of the lenticule 20, which receives light passed by a particular elongated light filter 22, 24. For example, the second width 28 of the first elongated light filter 22A and the second width 28 of the second elongated light filter 24A are each about one-half of the first width 26 of the lenticule 20A.

FIG. 1B is a block diagram of a top view of the exemplary display 10 illustrated in FIG. 1A according to one embodiment. Each of the first elongated light filters 22 is in an alternating arrangement with the second elongated light filters 24. Consequently, each first elongated light filter 22 is adjacent to at least one second elongated light filter 24, and in most instances, is adjacent to, or in between, two second elongated light filters 24. In one embodiment, the first elongated light filters 22 and the second elongated light filters 24 are arranged in filter pairs 30A-30I (generally, filter pairs 30 or filter pair 30). Each filter pair 30 includes a first elongated light filter 22 and a second elongated light filter 24. Each filter pair 30 also preferably corresponds to a particular lenticule 20 such that a line which is perpendicular to the first face 14 and which extends through a center of any of the filter pairs 30 also extends through the corresponding lenticule 20. For example, the line 32 is perpendicular to the first face 14 and extends through the center of the filter pair 30O, and also extends through the corresponding lenticule 20O. Generally, light waves passed through a particular filter pair 30 to the screen substrate 12 are then refracted in a desired direction by the corresponding lenticule 20.

Figure 2B:
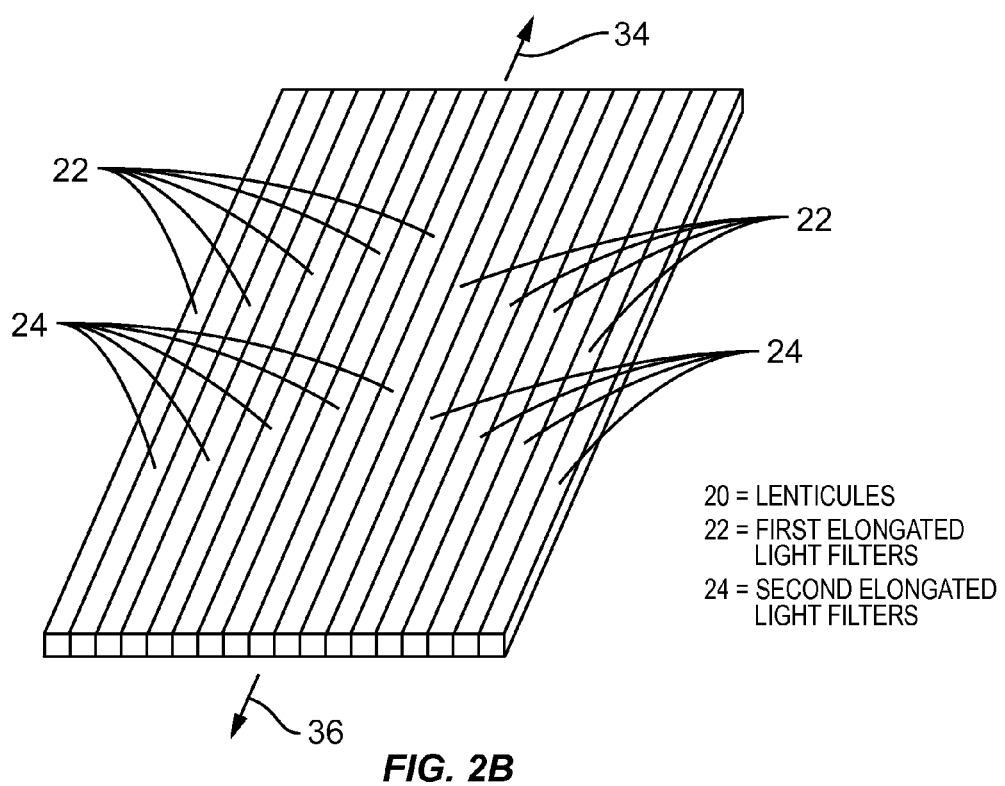

FIG. 2A is a block diagram of a front surface of the display 10 according to one embodiment. The front surface includes the plurality of lenticules 20 and is the surface that faces the viewer. The lenticules 20 extend in a first direction 34 and a second direction 36, and preferably have a length corresponding to a height of the screen substrate 12. FIG. 2B is a block diagram of a rear surface of the display 10 according to one embodiment. The rear surface includes the plurality of first elongated light filters 22 and the plurality of second elongated light filters 24. The first elongated light filters 22 and the second elongated light filters 24 also extend in the first direction 34 and the second direction 36, and also preferably have a length corresponding to a height of the screen substrate 12.

Figure 3:
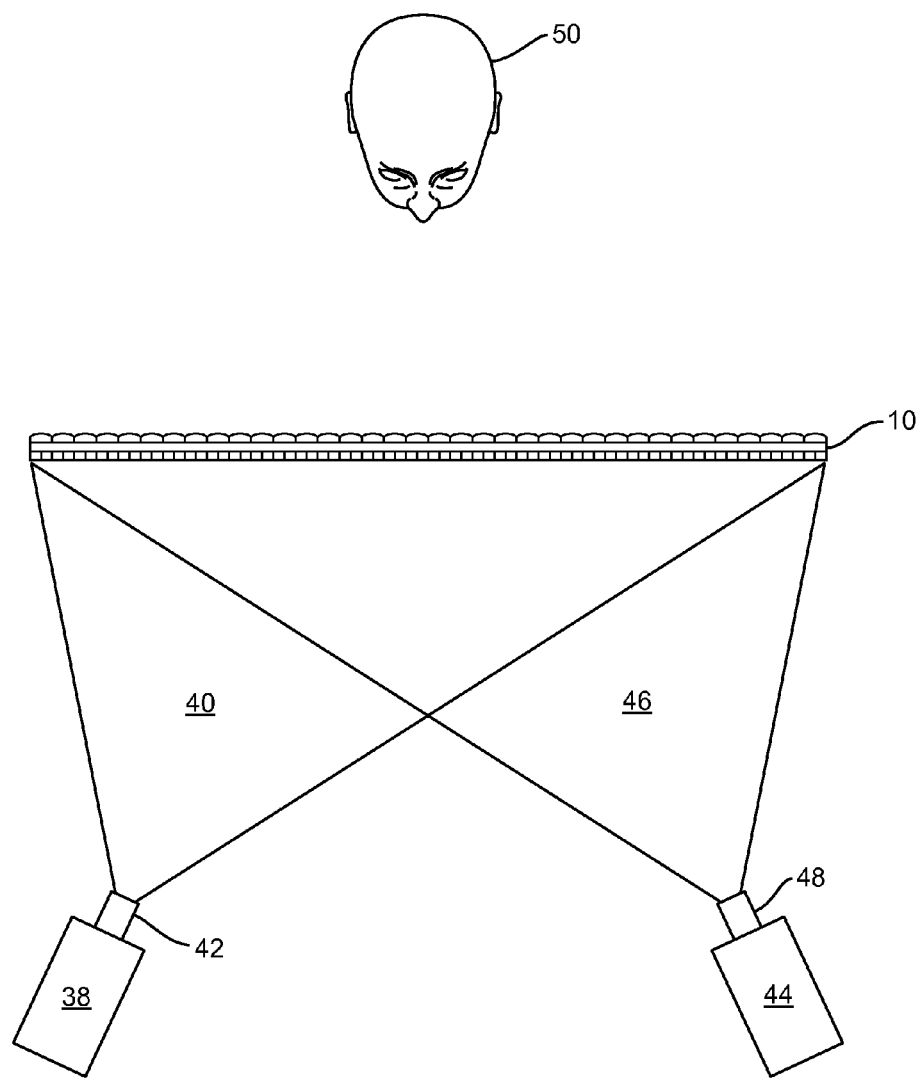
FIG. 3 is a block diagram of a system including first and second light emitters according to one embodiment.

FIG. 3 is a block diagram of an exemplary system which includes the display 10 illustrated in FIGS. 1 and 2, and first and second light emitters, according to one embodiment. A first light emitter 38 emits first light waves 40 that have a first orientation. As discussed previously, the first orientation may comprise, for example, a particular linear or circular polarization orientation. The first light emitter 38 may include a polarizer 42 which is adapted to orient, or pass, the first light waves 40 in the first orientation. The polarizer 42 may comprise, for example, a polarizing filter. A second light emitter 44 emits second light waves 46 that have a second orientation. The second light emitter 44 may include a polarizer 48, such as a polarizing filter, which is adapted to orient, or pass, the second light waves 46 in the second orientation.

Preferably, the first light emitter 38 and the second light emitter 44 receive respective video streams of a stereoscopic video stream (sometimes referred to as a three-dimensional (3D) video stream), such as a stereoscopic computer simulation, a stereoscopic movie, or a video stream produced in real time by a stereoscopic camera, for example. In this embodiment, the first light waves 40 may comprise the images associated with a first video stream of the stereoscopic video, which contains imagery of a first perspective, and the second light waves 46 may comprise the images associated with a second video stream of the stereoscopic video, which contains imagery of a second perspective. Both the first light waves 40 and the second light waves 46 are projected at the rear of the display 10 and are filtered by the first elongated light filters 22 and second elongated light filters 24. The first light waves 40 are passed by the first elongated light filters 22 to the screen substrate 12, through the screen substrate 12, and to a corresponding lenticule 20, where the light waves are refracted in accordance with the geometry of the lenticule 20 toward an eye of a viewer 50. All, or substantially all, of the second light waves 46 are filtered out by the first elongated light filters 22, and are not passed to the screen substrate 12. The second light waves 46 are passed by the second elongated light filters 24 to the screen substrate 12, through the screen substrate 12, and to the corresponding lenticule 20, where the light waves are refracted in accordance with the geometry of the lenticule 20 toward the other eye of the viewer 50. All, or substantially all, of the first light waves 40 are filtered out by the second elongated light filters 24, and are not passed to the screen substrate 12.

Figure 4:
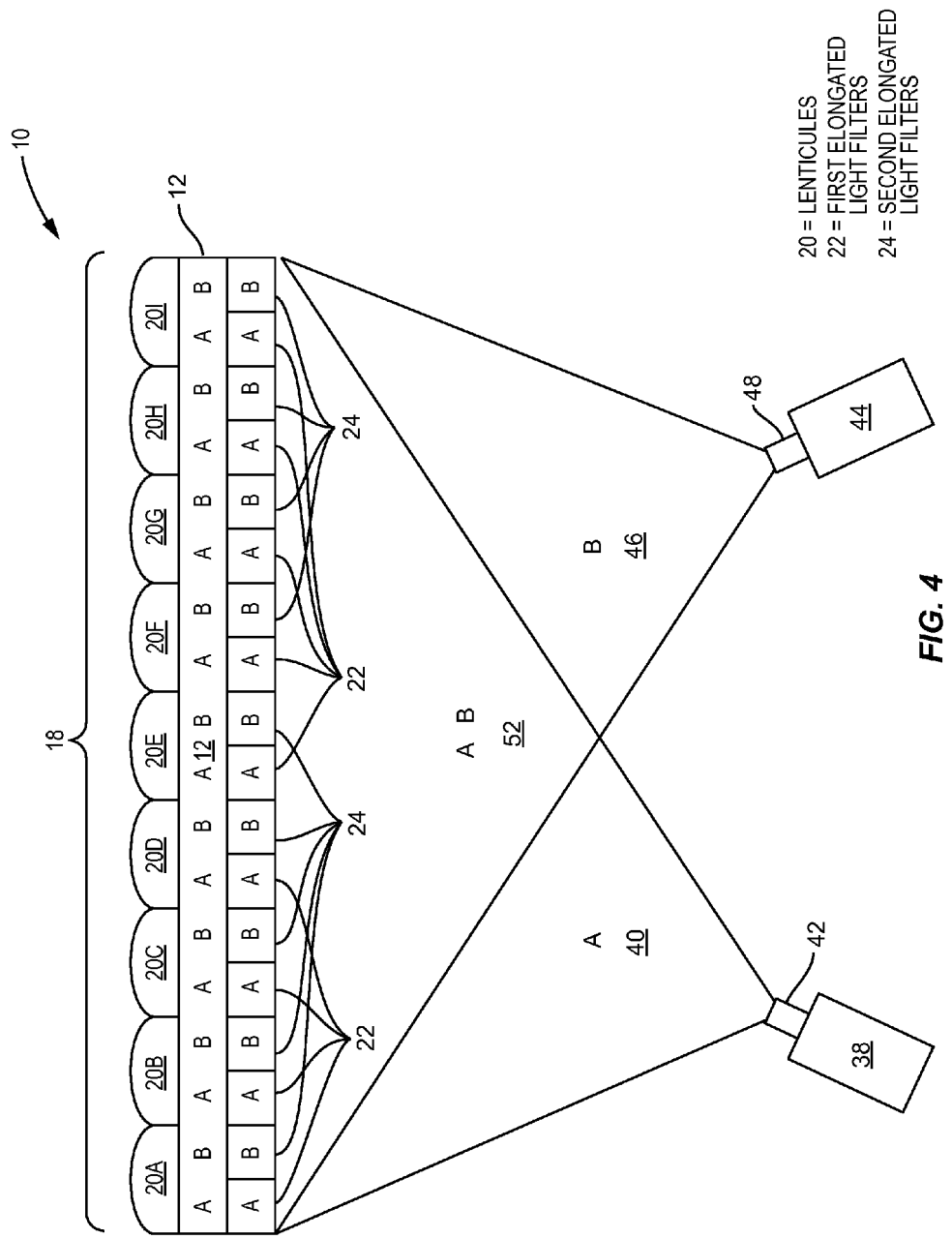
FIG. 4 is a block diagram illustrating the passing of light waves having first and second orientations through the display according to one embodiment.

FIG. 4 is a block diagram illustrating in greater detail the operation of the display 10 illustrated in FIG. 3. The first light waves 40 have a first orientation and are designated light waves "A." The second light waves 46 have a second orientation and are designated light waves "B." The intersection area 52 includes both the light waves A and the light waves B. As the light waves A impact the first elongated light filters 22, the first elongated light filters 22 pass the light waves A to the screen substrate 12. The letters "A" and "B" depicted in the screen substrate 12 indicate the passage of such light waves A and light waves B from the second face 16 to the first face 14. Note that the first elongated light filters 22 do not pass the light waves B to the second face 16, and thus block all, or substantially all, of the light waves B. The second elongated light filters 24 pass the light waves B to the screen substrate 12. Note that the second elongated light filters 24 do not pass the light waves A to the second face 16, and thus block all, or substantially all, of the light waves A.

As the light waves A enter the lenticules 20, they are refracted in a direction in accordance with the geometry of the corresponding lenticule 20. Preferably, the light waves A are directed toward one eye of the viewer 50, and the light waves B are directed toward the other eye of the viewer 50.

In this manner, the stereoscopic images provided by the first light emitter 38 and the second light emitter 44 are directed to separate eyes of the viewer 50. The brain of the viewer 50, receiving two stereoscopic images, fuses the images together to create a 3D scene, without the use of glasses. Moreover, the present invention eliminates a need to register an image-separating material with particular pixels, simplifying and reducing the cost associated with generating an auto-stereoscopic display.

Figure 5:
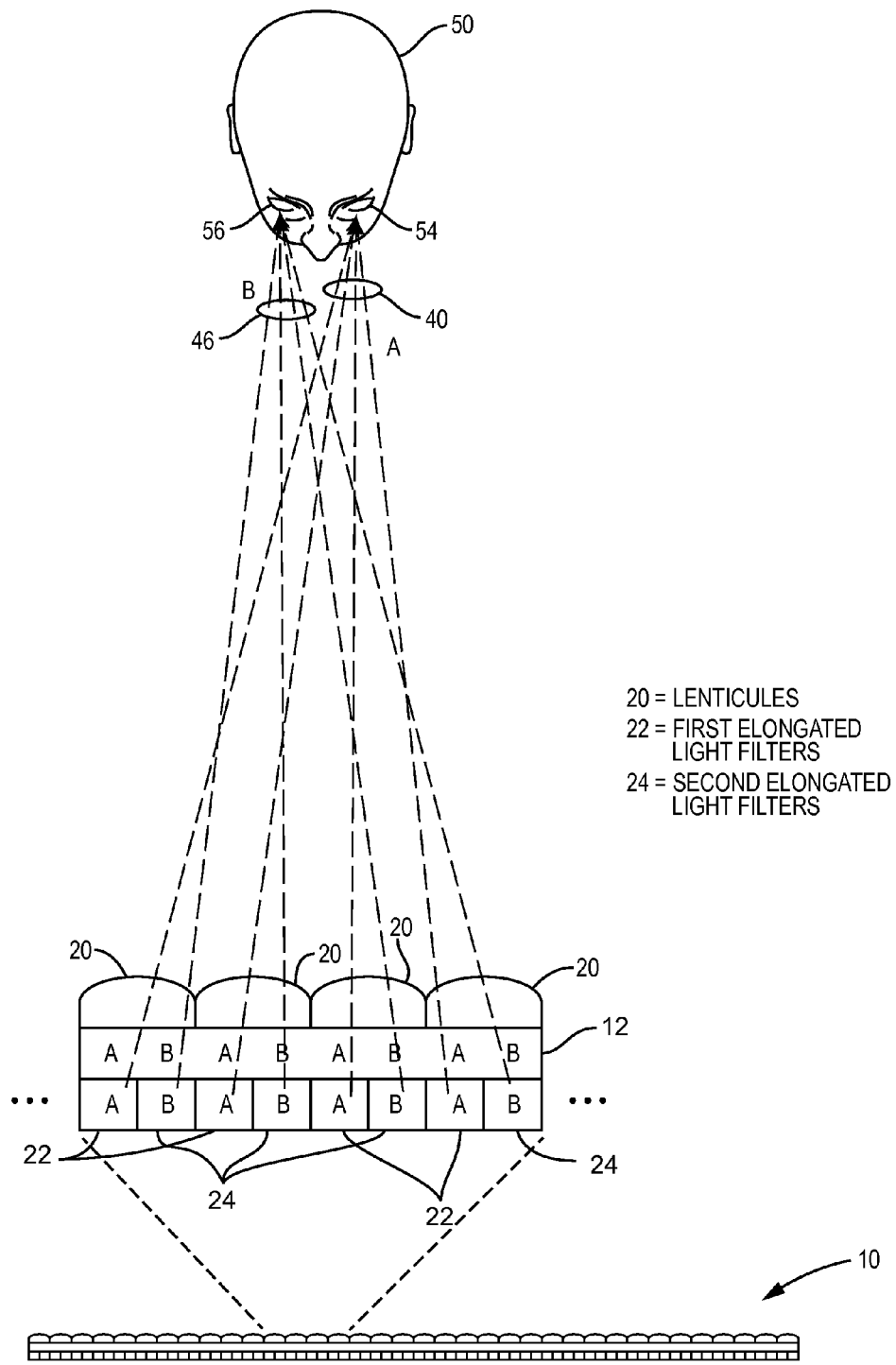
FIG. 5 is a block diagram of a portion of the display illustrated in FIG. 4, illustrating the refraction of light waves.

FIG. 5 is a block diagram of a portion of the display 10 illustrated in FIG. 4, illustrating the refraction of light waves toward the viewer 50. The lenticules 20 refract the light waves A (40) toward a left eye 54 of the viewer 50, and refract the light waves B (46) to the right eye 56 of the viewer 50. In this manner, each of the eyes 54, 56 is presented with stereoscopic images, enabling the viewer 50 to fuse the separate images together into a 3D scene without the use of glasses.

Those skilled in the art will recognize improvements and modifications to the preferred embodiments of the present disclosure. All such improvements and modifications are considered within the scope of the concepts disclosed herein and the claims that follow.

What is claimed is:

1. A projection display, comprising:
   a screen substrate having a first face and a second face;
   a lenticular array comprising a plurality of lenticules extending in a first direction and a second direction, the lenticular array affixed to the first face, wherein each of the plurality of lenticules has a first width;
   a plurality of first elongated light filters extending parallel to the plurality of lenticules, affixed to the second face, and adapted to pass light waves having a first orientation received from a first projector, wherein each of the plurality of first elongated light filters has a second width that is about one-half of the first width; and
   a plurality of second elongated light filters extending parallel to the plurality of lenticules, affixed to the second face, and adapted to pass light waves having a second orientation received from a second projector concurrently with the light waves having the first orientation, wherein the second orientation is different from the first orientation, wherein each of the plurality of second elongated light filters has the second width, and wherein each of the plurality of first elongated light filters is adjacent to at least one of the plurality of second elongated light filters.

2. The projection display of claim 1, wherein ones of the plurality of first elongated light filters are in an alternating arrangement with ones of the plurality of second elongated light filters.

3. The projection display of claim 1, wherein the plurality of first elongated light filters and the plurality of second elongated light filters comprise a plurality of filter pairs, wherein each of the filter pairs comprises a first elongated light filter and a second elongated light filter.

4. The projection display of claim 3, wherein each of the plurality of filter pairs corresponds to one of the plurality of lenticules, and wherein each of the plurality of filter pairs is affixed to the second face such that a line perpendicular to the first face that extends through a center of any of the filter pairs extends through the corresponding one of the plurality of lenticules.

5. The projection display of claim 1, wherein the first orientation comprises a right-hand circularly polarized orientation, and the second orientation comprises a left-hand circularly polarized orientation.

6. The projection display of claim 1, wherein the projection display is a part of a system further comprising:
   a first light emitter adapted to emit the light waves having the first orientation; and
   a second light emitter adapted to emit the light waves having the second orientation.

7. The projection display of claim 6, wherein the first light emitter further comprises a first polarized filter that is adapted to emit the light waves having the first orientation, and the second light emitter further comprises a second polarized filter that is adapted to emit the light waves having the second orientation.

8. The projection display of claim 1, wherein the first orientation comprises a first polarized orientation, and wherein the plurality of first elongated light filters comprises polarized filters which are adapted to pass the light waves having the first polarized orientation and to block substantially all light waves having a polarized orientation that is different from the first polarized orientation.

9. A method of providing a stereoscopic image to a projection display, comprising:
   projecting first light waves from a first projector comprising imagery associated with a first perspective of an image at the projection display, the first light waves having a first orientation, the projection display comprising:
   a first face and a second face;
   a lenticular array comprising a plurality of lenticules extending in a first direction and a second direction, the lenticular array affixed to the first face, wherein each of the plurality of lenticules has a first width;
   a plurality of first elongated light filters extending in the first direction and the second direction and affixed to the second face and adapted to pass the first light waves having the first orientation, wherein each of the plurality of first elongated light filters has a second width that is about one-half the first width;
   a plurality of second elongated light filters extending in the first direction and the second direction and affixed to the second face and adapted to pass light waves having a second orientation, wherein each of the plurality of second elongated light filters has the second width, and wherein each of the plurality of first elongated light filters is adjacent to at least one of the plurality of second elongated light filters; and projecting second light waves from a second projector comprising imagery associated with a second perspective of the image at the projection display, the second light waves having the second orientation and being projected concurrently with the first light waves having the first orientation.

10. The method of claim 9, wherein the first light waves and the second light waves are projected in a direction toward the second face.

11. The method of claim 9, wherein the stereoscopic image comprises a stereoscopic video.

12. The method of claim 11, wherein the stereoscopic video comprises a three-dimensional (3D) movie.

13. The method of claim 11, wherein the stereoscopic video comprises a computer simulation.

14. The method of claim 9, wherein ones of the plurality of first elongated light filters are in an alternating arrangement with ones of the plurality of second elongated light filters.

15. A method of making a projection display, comprising:
providing a screen substrate having a first face and a second face;
affixing to the first face a lenticular array comprising a plurality of lenticules extending in a first direction and a second direction, the lenticular array affixed to the first face, wherein each of the plurality of lenticules has a first width;

affixing to the second face a plurality of first elongated light filters extending in the first direction and the second direction and adapted to pass light waves having a first orientation received from a first projector, wherein each of the plurality of first elongated light filters has a second width that is about one-half the first width; and affixing to the second face a plurality of second elongated light filters extending in the first direction and the second direction and adapted to pass light waves having a second orientation received from a second projector concurrently as the plurality of first elongated light filter pass the light waves having the first orientation, wherein each of the plurality of second elongated light filters has the second width, and wherein each of the plurality of first elongated light filters is adjacent to at least one of the plurality of second elongated light filters.

16. The method of claim 15, wherein affixing to the first face the lenticular array comprises forming the lenticular array on the first face.

17. The method of claim 15, wherein affixing to the second face the plurality of first elongated light filters comprises forming the first elongated light filters on the second face.

18. The method of claim 15, wherein the plurality of first elongated light filters and the plurality of second elongated light filters are affixed to the second face such that ones of the plurality of first elongated light filters are in an alternating arrangement with ones of the plurality of second elongated light filters.

* * * * *